(12) United States Patent
Vashi et al.

(10) Patent No.: US 10,098,181 B2
(45) Date of Patent: Oct. 9, 2018

(54) SELECTING A RADIO ACCESS TECHNOLOGY MODE BASED ON CURRENT CONDITIONS

(71) Applicant: Apple Inc., Cupertino, CA (US)

(72) Inventors: Prashant H Vashi, Sunnyvale, CA (US); Vikram B Yerrabommanahalli, Sunnyvale, CA (US); Teck Yang Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 475 days.

(21) Appl. No.: 14/273,656

(22) Filed: May 9, 2014

(65) Prior Publication Data

US 2015/0271690 A1 Sep. 24, 2015

Related U.S. Application Data

(60) Provisional application No. 61/955,411, filed on Mar. 19, 2014.

(51) Int. Cl.
*H04W 88/06* (2009.01)
*H04B 7/024* (2017.01)
*H04W 36/14* (2009.01)
*H04W 48/18* (2009.01)

(52) U.S. Cl.
CPC .......... *H04W 88/06* (2013.01); *H04B 7/024* (2013.01); *H04W 36/14* (2013.01); *H04W 48/18* (2013.01)

(58) Field of Classification Search
None
See application file for complete search history.

(56) References Cited

U.S. PATENT DOCUMENTS

| 7,680,469 | B2 * | 3/2010 | Fry ........................... 455/127.1 |
| 8,068,877 | B1 * | 11/2011 | Mansour ..................... 455/562.1 |
| 8,259,592 | B2 | 9/2012 | Rahman et al. |
| 8,346,315 | B2 | 1/2013 | Lindoff et al. |
| 8,743,809 | B2 * | 6/2014 | Vashi et al. .................. 370/329 |

(Continued)

FOREIGN PATENT DOCUMENTS

WO  WO 2004/057903  7/2004
WO  WO 2007/133526  11/2007
(Continued)

OTHER PUBLICATIONS

Japanese Office Action, Application No. 2015-038104, dated Mar. 24, 2016, 13 pages.

(Continued)

*Primary Examiner* — Peter Chen
(74) *Attorney, Agent, or Firm* — Meyertons Hood Kivlin Kowert & Goetzel, P.C.; Jeffrey C. Hood; Joel L. Stevens

(57) ABSTRACT

Determining whether to operate in a single radio access technology (RAT) mode or a dual RAT mode for a user equipment (UE) having a radio capable of communicating using at least a first RAT and a second RAT. The UE may determine whether current path loss for the first RAT exceeds a maximum path loss. Based on the results of determining whether the current path loss for the first RAT exceeds the maximum path loss, the UE may determine whether to operate in the single RAT mode or the dual RAT mode. Accordingly, based on this determination, the UE may operate in the single RAT mode or the dual RAT mode based on the determination.

20 Claims, 12 Drawing Sheets

(56) References Cited

U.S. PATENT DOCUMENTS

| | | |
|---|---|---|
| 2007/0218906 A1 | 9/2007 | Melia et al. |
| 2008/0233955 A1 | 9/2008 | Narang et al. |
| 2011/0228749 A1* | 9/2011 | Taghavi Nasrabadi ................... H04L 12/5692 370/338 |
| 2012/0115553 A1* | 5/2012 | Mahe et al. ................ 455/575.7 |
| 2012/0184327 A1* | 7/2012 | Love ................... H04B 1/0064 455/552.1 |
| 2013/0201890 A1 | 8/2013 | Swaminathan et al. |
| 2013/0225094 A1* | 8/2013 | Mujtaba et al. ................ 455/73 |
| 2013/0310036 A1 | 11/2013 | Molloy et al. |
| 2013/0343251 A1* | 12/2013 | Zhang ........................... 370/311 |
| 2014/0056165 A1* | 2/2014 | Siomina ............... H04B 1/7083 370/252 |
| 2014/0140287 A1* | 5/2014 | Cheng ........................... 370/329 |
| 2014/0364123 A1* | 12/2014 | Shahidi ............. H04W 36/0083 455/437 |
| 2015/0117360 A1* | 4/2015 | Shen ................... H04W 52/242 370/329 |

FOREIGN PATENT DOCUMENTS

| | | |
|---|---|---|
| WO | 2010068160 | 6/2010 |
| WO | 2012008957 A1 | 1/2012 |
| WO | 2013188545 A1 | 12/2013 |

OTHER PUBLICATIONS

Notification of the First Office Action, Chinese Application for Invention No. 201510092925.8, dated Nov. 27, 2017, 18 pages.

Office Action for German Patent Application No. DE 10 2015 203 265.5, dated Jan. 24, 2017, pp. 1-46.

* cited by examiner

SELECTING A RADIO ACCESS TECHNOLOGY MODE BASED ON CURRENT CONDITIONS

PRIORITY INFORMATION

The present application claims benefit of priority of U.S. Provisional Application Ser. No. 61/955,411, titled "Selecting a Radio Access Technology Mode Based on Current Conditions", whose inventors are Prashant H. Vashi, Vikram B. Yerrabommanahalli, and Teck Yang Lee, which was filed on Mar. 19, 2014, and which is hereby incorporated by reference in its entirety as though fully and completely set forth herein.

FIELD

The present application relates to the field of wireless communication, and more particularly to a system and method for selecting a radio access technology (RAT) mode based on current conditions.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Additionally, there exist numerous different wireless communication technologies and standards. Some examples of wireless communication standards include GSM, UMTS, LTE, CDMA2000 (e.g., 1×RTT, 1×EV-DO), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

In order to provide continuity between generations of wireless communication technologies, in order to provide complementary functionality, and/or for other reasons, it may often be desirable to provide the ability for a device to communicate using multiple wireless technologies or standards. In some cases, this may be accomplished by providing separate functional blocks for each wireless communication technology or standard in a device. However, this may incur additional costs associated with the device due to more (and in some cases duplicate) components being required, and may introduce inefficiencies in device operation (e.g., greater power requirements due to multiple radios, interference between radios adversely affecting each other). This may also adversely affect the form factor of the device, especially if the device is a mobile device for which a smaller (e.g., slimmer, lighter) form factor may be desirable.

An alternative might include a device which uses a single functional block (e.g., a single radio) to implement multiple wireless communication technologies. However, sharing a single radio between multiple wireless technologies has its own set of challenges. For example, if only one wireless technology can use the radio at a time, there may occasionally (or frequently) be conflicts between the wireless technologies for use of the radio. Accordingly, improvements in wireless communications and devices performing wireless communications would be desirable.

SUMMARY

As noted above, a device which uses a single functional block (e.g., a single radio) to implement multiple wireless communication technologies may have significant advantages relative to a device which uses separate functional blocks (e.g., separate radios) to implement different wireless communication technologies. Such a device could potentially have a lower manufacturing cost (e.g., due to fewer required components and/or simpler overall architecture) and more efficient operation (e.g., due to lower power requirements for the single radio). Additionally, such a single radio design may readily allow for a more desirable form factor (e.g., slimmer, lighter) of the device itself. However, in order to provide a single radio which effectively implements multiple wireless technologies, sophisticated control algorithms may be necessary.

As one example, in some cases a device may implement separate protocol stacks for each of multiple radio-access technologies (RATs) that share a radio. The protocol stacks may take turns operating the radio. If both protocol stacks are scheduled to use the radio at the same time, there may be a conflict or collision between the RATs.

The device may be configured to operate in a single RAT mode or in a multiple or dual RAT mode, depending on various factors. For example, the device may be configured to communicate using, e.g., using a single radio, a first RAT (e.g., a packet switched technology, such as long term evolution (LTE)) and/or a second RAT (e.g., a circuit switched technology, such as global system for mobile communications (GSM) and/or 1× technologies). In some embodiments, the device may have a preference to operate in a single RAT mode, e.g., corresponding to the first RAT, due to battery consumption or other factors.

However, if the current network conditions for the first RAT are insufficient to support a call, or current network conditions indicate that a call using the first RAT may fail in the future, the device may switch from operating in the single RAT mode to operating in a dual RAT mode, so that fail-over from the first RAT to the second RAT could be achieved without significant quality issues for the user. Additionally, while operating in the dual RAT mode, if current network conditions indicate that the first RAT is sufficient to support a call, the device may switch from operating in the dual RAT mode to operating in the single RAT mode.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
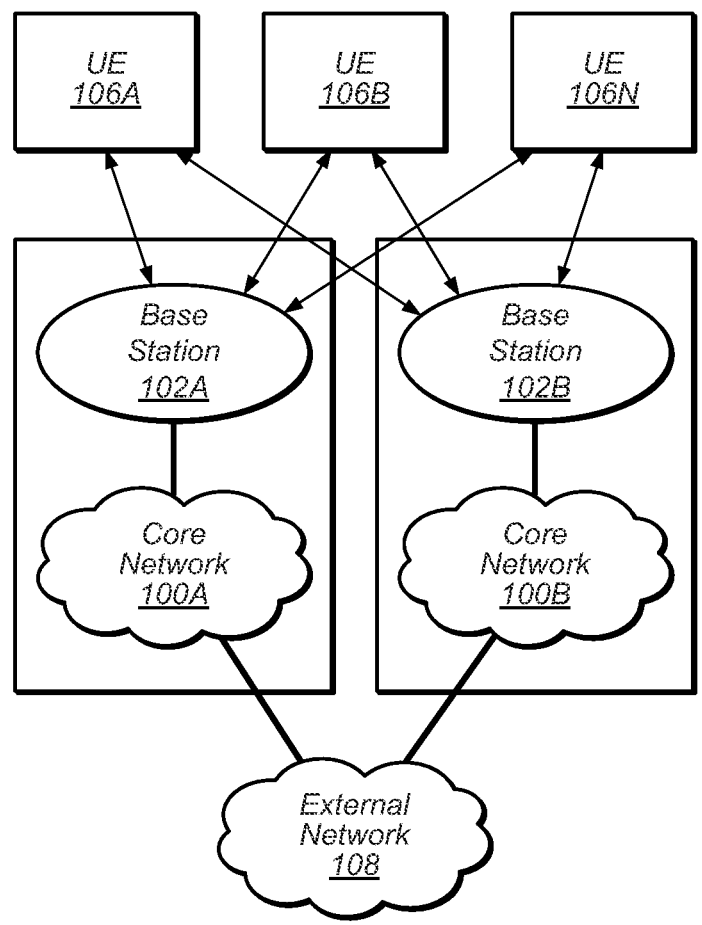
FIG. 1 illustrates an exemplary wireless communication system.

While the features described herein susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
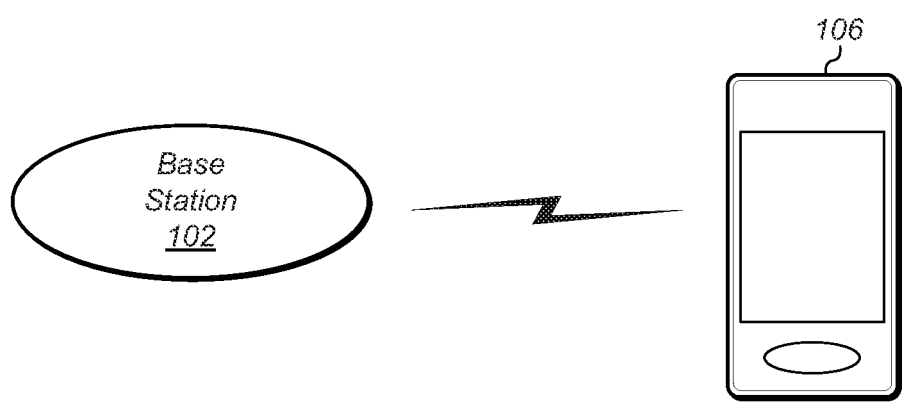
FIG. 2 illustrates a base station in communication with a user equipment device.
Figure 3:
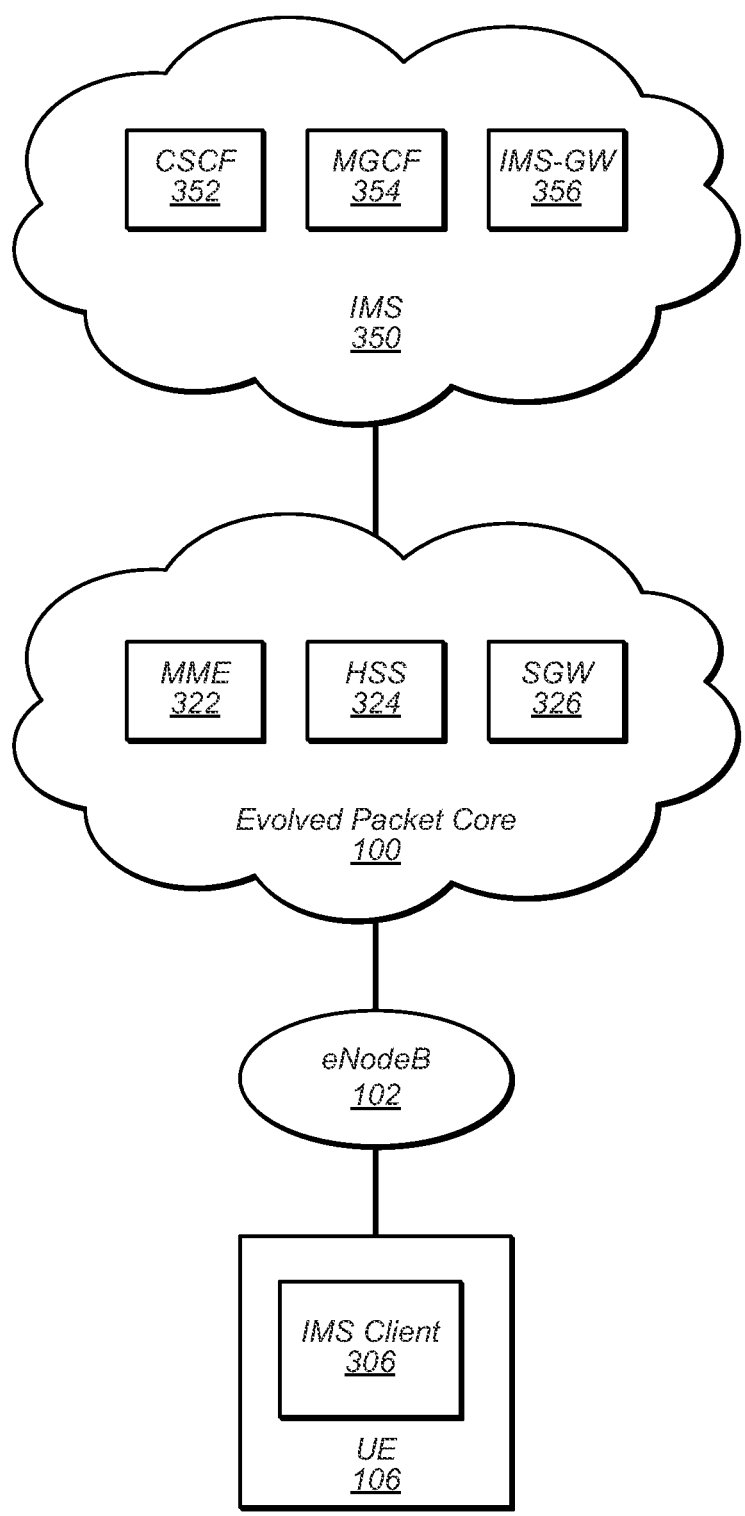
FIG. 3 illustrates a user equipment device in communication with a network via a base station.

FIGS. 1-3—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes base stations 102A and 102B which communicate over a transmission medium with one or more user devices 106A through 106N. Each of the user devices may be referred to herein as a "user equipment" (UE). Thus, the user devices are referred to as UEs or UE devices.

The base stations 102 may be base transceiver stations (BTS) or cell sites, and may include hardware that enables wireless communication with the user devices 106A through 106N. Each base station 102 may also be equipped to communicate with a core network 100 (Base station 102A may be coupled to core network 100A, while base station 102B may be coupled to core network 100B), which may be a core network of a cellular service provider. Each core network 100 may also be coupled to one or more external networks (such as external network 108), which may include the Internet, a Public Switched Telephone Network (PSTN), and/or any other network. Thus, the base stations 102 may facilitate communication between the user devices 106 and/or between the user devices 106 and the networks 100A, 100B, and 108.

The base stations 102 and the user devices 106 may be configured to communicate over the transmission medium using any of various radio access technologies ("RATs", also referred to as wireless communication technologies) or telecommunication standards such as GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B operate according to a second (e.g., different) RAT (e.g., CDMA 2000 or GSM, among other possibilities). The two networks may be controlled by the same network operator (e.g., cellular service provider or "carrier"), or by different network operators, as desired. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the exemplary network configuration shown in FIG. 1, other network configurations implementing multiple cellular communication technologies are also possible. As one example, base stations 102A and 102B might operate according to different cellular communication technologies but couple to the same core network. As another example, multi-mode base stations capable of simultaneously supporting different cellular communication technologies (e.g., LTE and CDMA2000 1xRTT, LTE and GSM, and/or any other combination of cellular communication technologies) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1xRTT).

A UE 106 may be capable of communicating using multiple wireless communication standards, such as 3GPP, 3GPP2, or any desired standards. The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of RATs or wireless communication standards (including more than two RATs or wireless communication standards) are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more cellular communication standards.

FIG. 2 illustrates user equipment 106 (e.g., one of the devices 106A through 106N) in communication with a base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. The UE 106 may also or alternatively include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1xRTT/1xEV-DO/HRPD/eHRPD) or LTE using a single shared radio and/or GSM or LTE using the single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

FIG. 3 illustrates an exemplary, simplified portion of a wireless communication system that may be particularly useful for implementing voice over IP communication, such as voice over LTE (VoLTE) in an LTE network. As shown, the UE 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. Similar to the EPC 100, the IMS 350 may include various other devices known to those skilled in the art as well.

Thus, the system of FIG. 3 illustrates an exemplary portion of the data pathway used for voice over IP communication, e.g., VoLTE.

Figure 4:
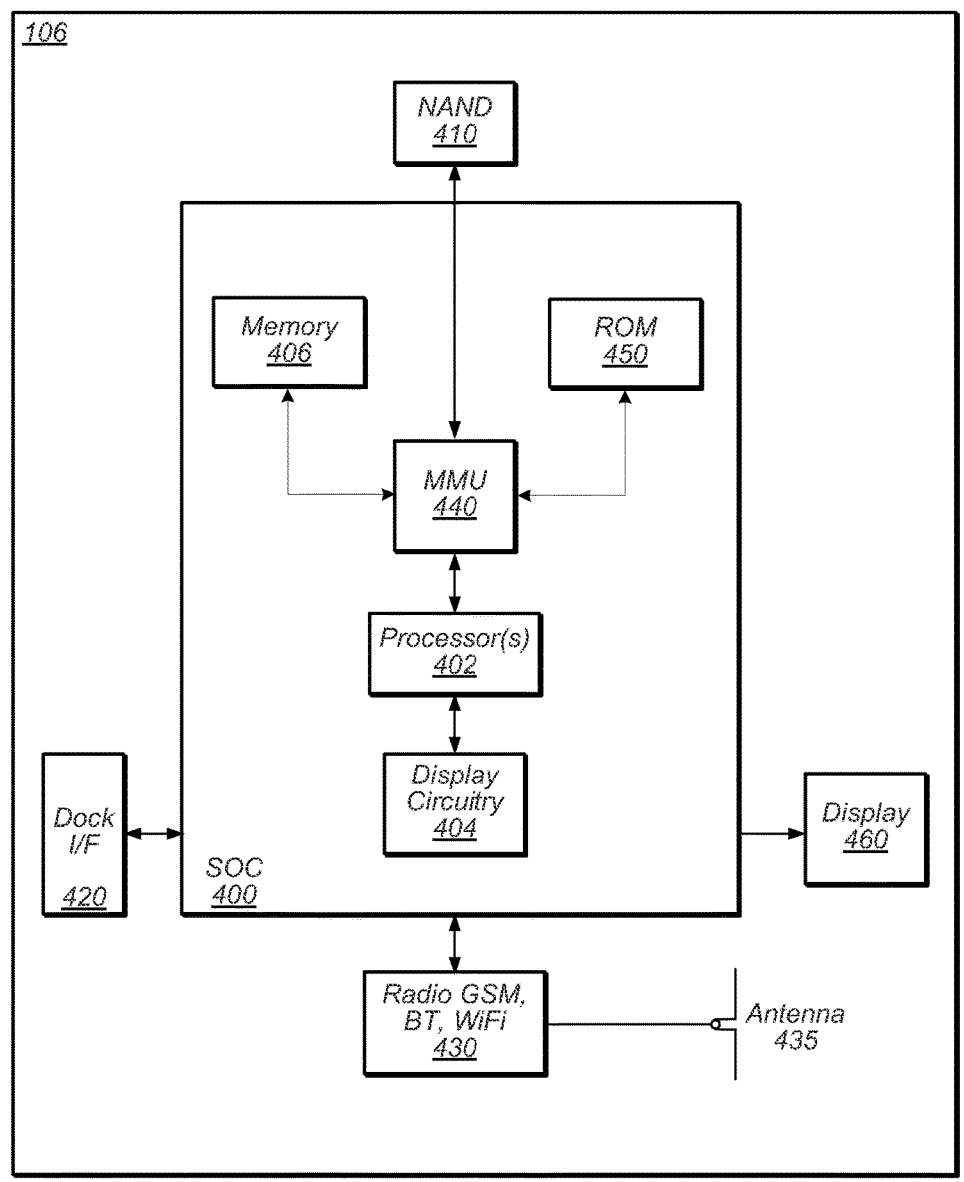
FIG. 4 is an example block diagram of a user equipment device.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry (radio(s)) 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna 435 to perform the wireless communication.

As described herein, the UE 106 may include hardware and software components for implementing features for communicating using one or more wireless communication technologies, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
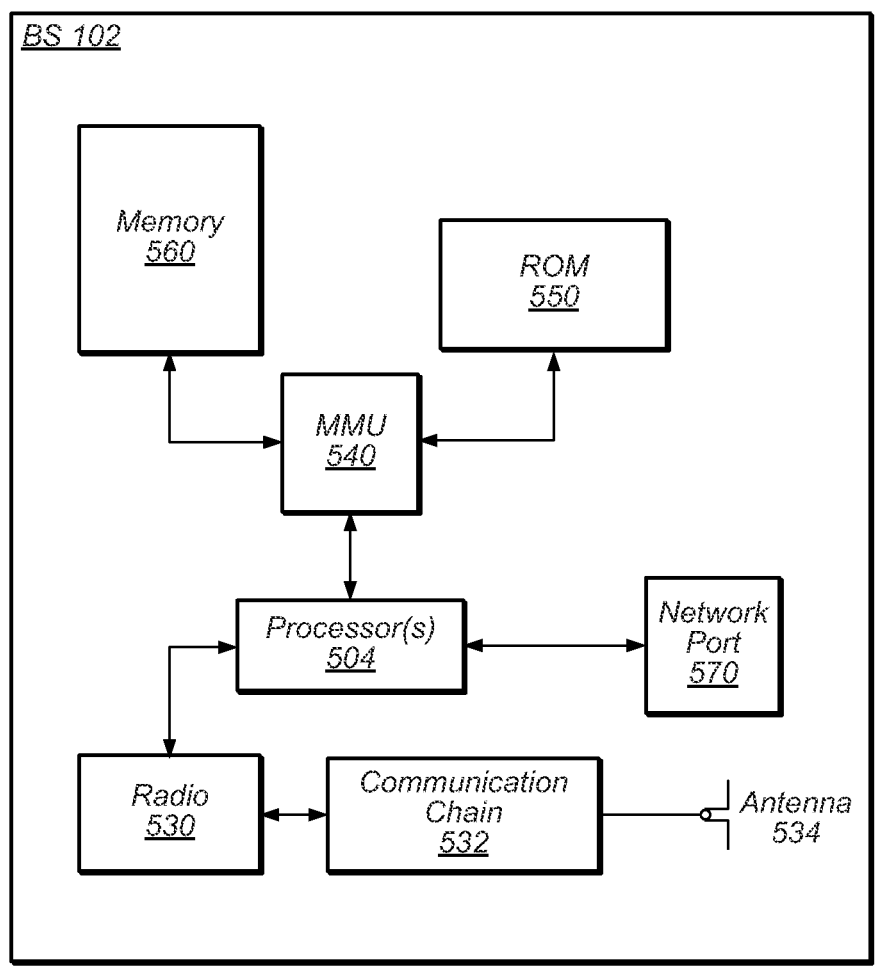
FIG. 5 is an example block diagram of a base station.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various wireless communication technologies, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6A:
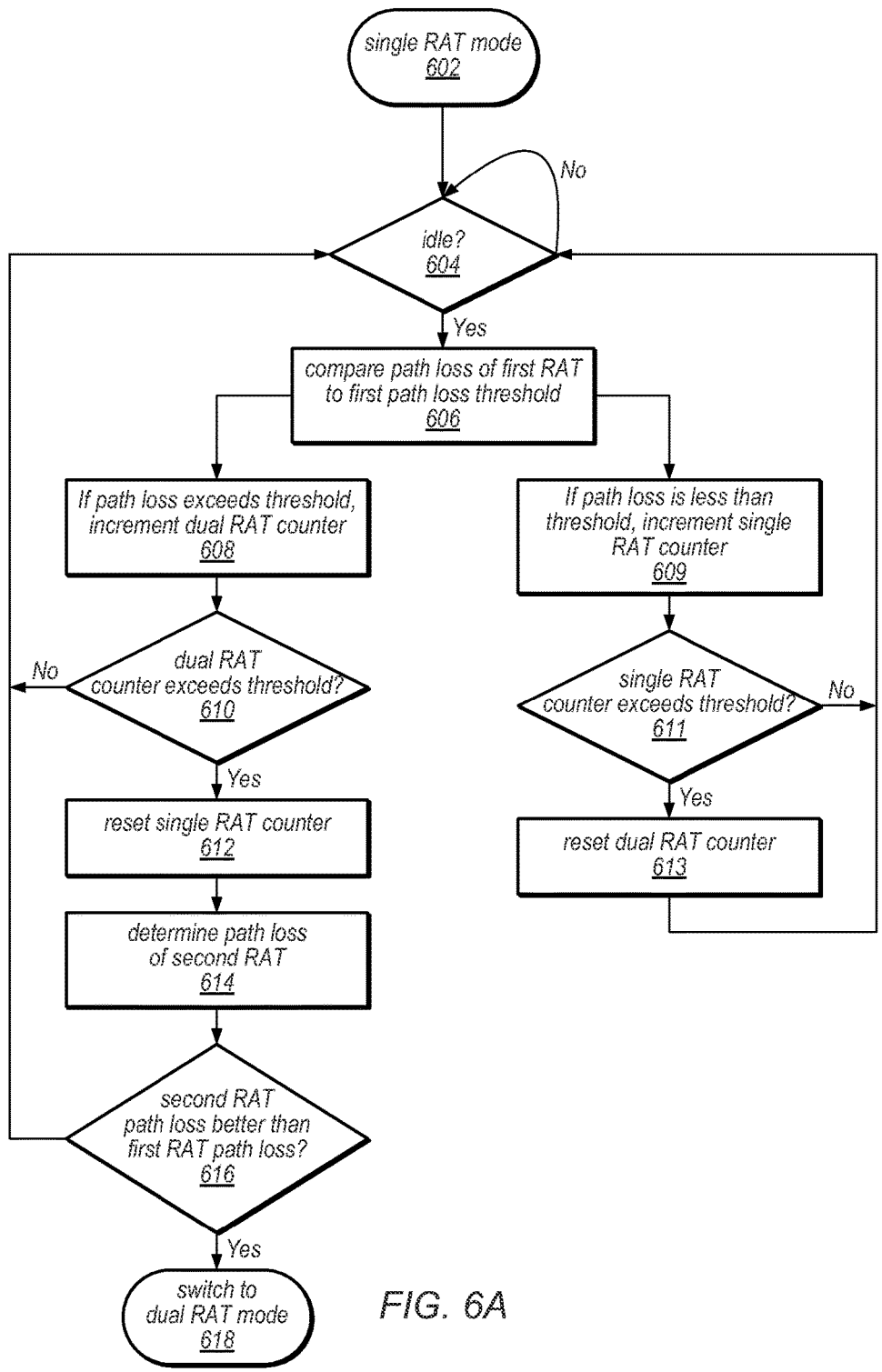
FIGS. 6A-11 are flowchart diagrams illustrating exemplary methods for switching between a single RAT mode and a dual RAT mode, based on various factors.
Figure 6B:
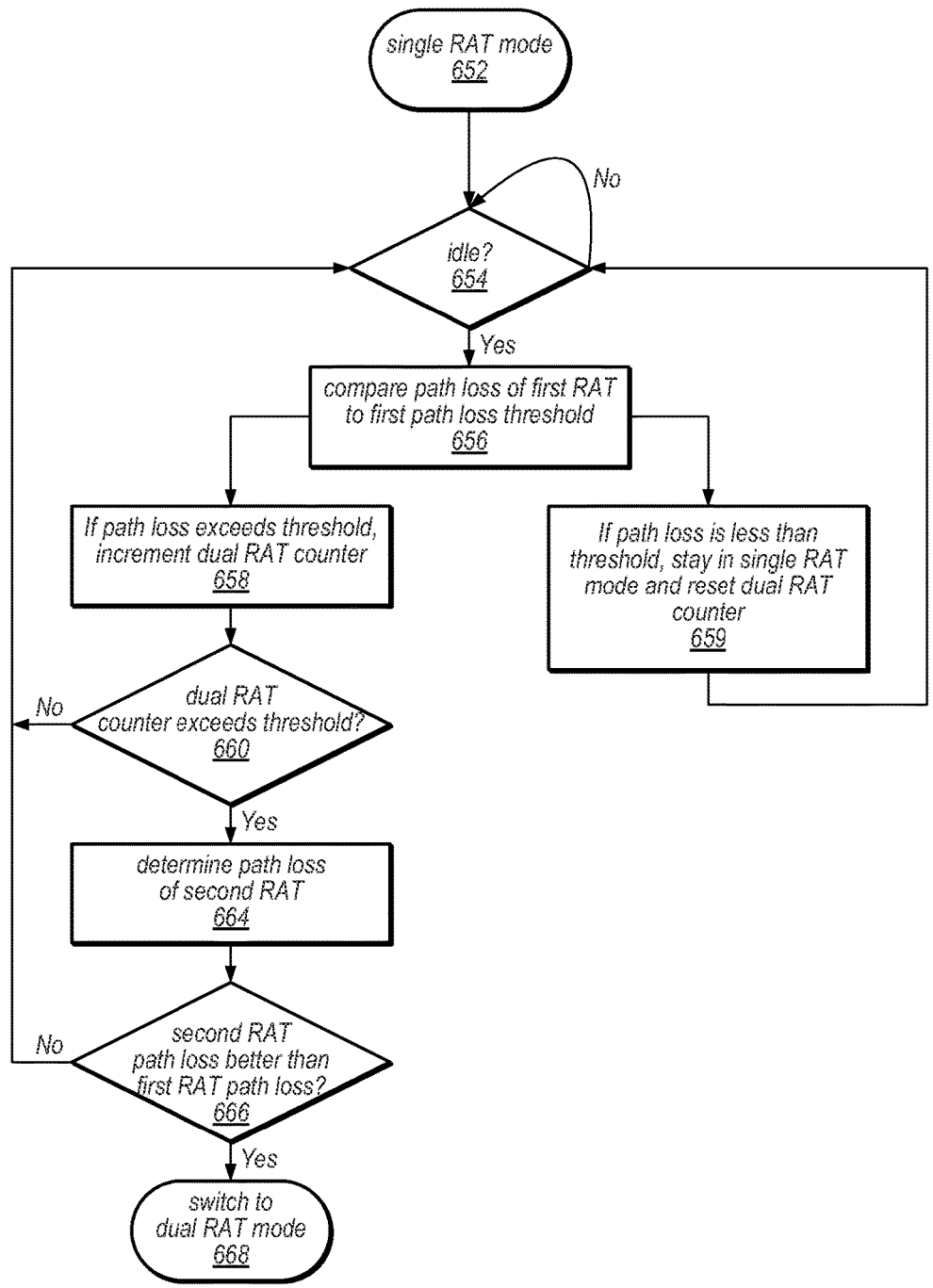

FIGS. 6A and 6B—Single RAT Mode

FIG. 6A is a flowchart diagram illustrating a method while operating in a single RAT mode. The method may be implemented by a wireless UE device (such as UE 106), which may be configured to communicate using multiple RATs. The method shown in FIG. 6A may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

As shown, in 602, the method may begin while in a single RAT mode. The single RAT mode may correspond to a first RAT, which may be a packet-switched technology, such as LTE. As described below, the method may later enter into a dual RAT mode, where two technologies (the first RAT and a second RAT) may be used concurrently. The second RAT may be a circuit switched technology or a lower generation technology, such as a 1× or GSM technology. In one embodiment, a single radio may be used for both RATs at the same time, e.g., by periodically tuning away from the first RAT to the second RAT in order to maintain connections using both RATs. Alternatively, the two RATs may be implemented using more than one radio, as desired.

In some embodiments, the method may involve the use of one or more counters, discussed in more detail below. For example, there may be a counter corresponding to single RAT mode (hereinafter referred to as "single RAT counter") and/or a counter corresponding to dual RAT mode (hereinafter referred to as "dual RAT counter"). In one embodiment, these counters may be initially set to values of 0. Additionally, the counters may be reset to 0 on a new RRC connection. However, the method may also be implemented without counters, if desired.

In the embodiment shown, the described steps below may be performed while in idle mode. Accordingly, in one exemplary embodiment, as shown in 604, the method may continue only while in idle mode. However, it should be noted that there may be other embodiments where the method could be applied while not idling, as desired.

Continuing from 604, in 606, the current network conditions for the first RAT may be measured, e.g., at each scheduled wake-up period, which may be within each discontinuous reception (DRX) wake-up cycle. In one embodiment, as shown, the method may determine the current path loss for the first RAT, although other metrics may be used.

The current network conditions may be compared to a threshold associated with the metric used to measure the current network conditions. For example, where path loss is used, the current path loss may be compared to a first path loss threshold. This first path loss threshold may be set at a value where a call could likely be sustained using the first RAT and/or where, if path loss exceeded the threshold, the call could not be (or likely could not be) sustained. In one embodiment, the pass loss threshold may have a buffer before which the call could not be sustained. The result of this comparison results in the branching to 608 and 609, discussed below. Note that while the remainder of this discussion uses the path loss metric, the method may be extended to any other metric or combination of metrics, as desired.

Turning to 608, if the path loss exceeds the first path loss threshold, then the dual RAT counter may be incremented. Note that the comparison of the path loss to the threshold may be implemented in a variety of ways. For example, in one embodiment, the path loss may be compared directly to the first path loss threshold; however, in alternate embodiments, the expression may be: is a maximum allowed path loss−current path loss<=X? In this alternate expression there may be a value associated with maximum allowed path loss, and the result of the subtraction of that value from the current path loss may be compared to a threshold value X. However, this expression could also easily be converted to the first path loss threshold mentioned previously.

In 610, the method may determine if the dual RAT counter exceeds a dual RAT threshold. If not, the method may return to 604. If the dual RAT counter does exceed the dual RAT threshold, then the method may continue to 612.

In 612, if the dual RAT counter exceeds the dual RAT threshold, the single RAT counter may be reset.

In 614, network conditions of the second RAT may be determined. Similar to above, the network conditions may be measured using any desired metric. In one embodiment, the metric used in 612 may be similar to the metric determined in 606, e.g., path loss. Similar to above, path loss will be used as the exemplary metric in these discussions, but other metrics are envisioned.

In 616, the method may determine whether the path loss of the second RAT is better than (e.g., less than) the path loss of the first RAT. Or, said another way, the method may determine if the second RAT is more likely to sustain a call than the first RAT, based on the measured path loss. If the second RAT path loss is better than the first RAT path loss, e.g., than a threshold amount, then the method may switch to dual RAT mode in 618. However, if the second RAT path loss is not better than the first RAT path loss, then the method may return to 604.

Turning to 609, in the case that the current path loss does not exceed the first path loss threshold (or alternatively expressed: maximum allowed path loss−current path loss>X?), a single RAT counter may be incremented.

In 611, the method compares the single RAT counter to a single RAT threshold. If the single RAT counter does not exceed the single RAT threshold, the method may return to 604. Alternatively, in 613, based on the single RAT counter exceeding the single RAT threshold, the dual RAT counter may be reset, and the method may return to 604.

Thus, comparing the two sides of the flow chart, if the path loss repeatedly exceeds the path loss threshold, as indicated by the dual RAT counter, then the quality of the second RAT may be compared, and if it has an appropriate quality, the mode may be switched from the single RAT mode to the dual RAT mode. Accordingly, if the network quality is below the required threshold or is decreasing, such a switch is likely to occur. On the other hand, if the path loss is repeatedly below the path loss threshold, as indicated by the single RAT counter, then the dual RAT counter may be reset. As a result, a new set of repeated path loss failures would be required to result in switching to the dual RAT mode from the single RAT mode.

Note that the method may be modified to require that either counter represents consecutive failures or passes of the path loss comparison to the path loss threshold. For example, the single RAT counter may be used to represent repeated, consecutive failures of the path loss comparison. Accordingly, in such an embodiment, the mode would not be switched from single RAT mode to dual RAT mode unless the test was failed a repeated, consecutive number of times, rather than a cumulative number of times. Similar comments may apply to the dual RAT counter as well.

FIG. 6B is a flowchart diagram illustrating a method while operating in a single RAT mode and may apply particularly to an exemplary consecutive embodiment, similar to discussions above. The method may be implemented by a wireless UE device (such as UE 106), which may be configured to communicate using multiple RATs. The method shown in FIG. 6B may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

Steps 652, 654, 656, 658, 660, 664, 666, and 668 may operate similarly to 602, 604, 606, 608, 610, 614, 616, and 618, respectively, except that the embodiment of FIG. 6B may particularly apply to an embodiment where the dual RAT counter must exceed the dual RAT threshold on a consecutive basis, and may exclude other possibilities, such as cumulative values. In this embodiment, a single RAT counter may not be necessary for the process of FIG. 6B. More specifically, since FIG. 6B corresponds to a consecutive embodiment, there is no need to maintain a single RAT counter, and in cases where the path loss is less than the threshold, the UE may remain in single RAT mode and the dual RAT counter may simply be reset, as shown in 659.

Figure 7A:
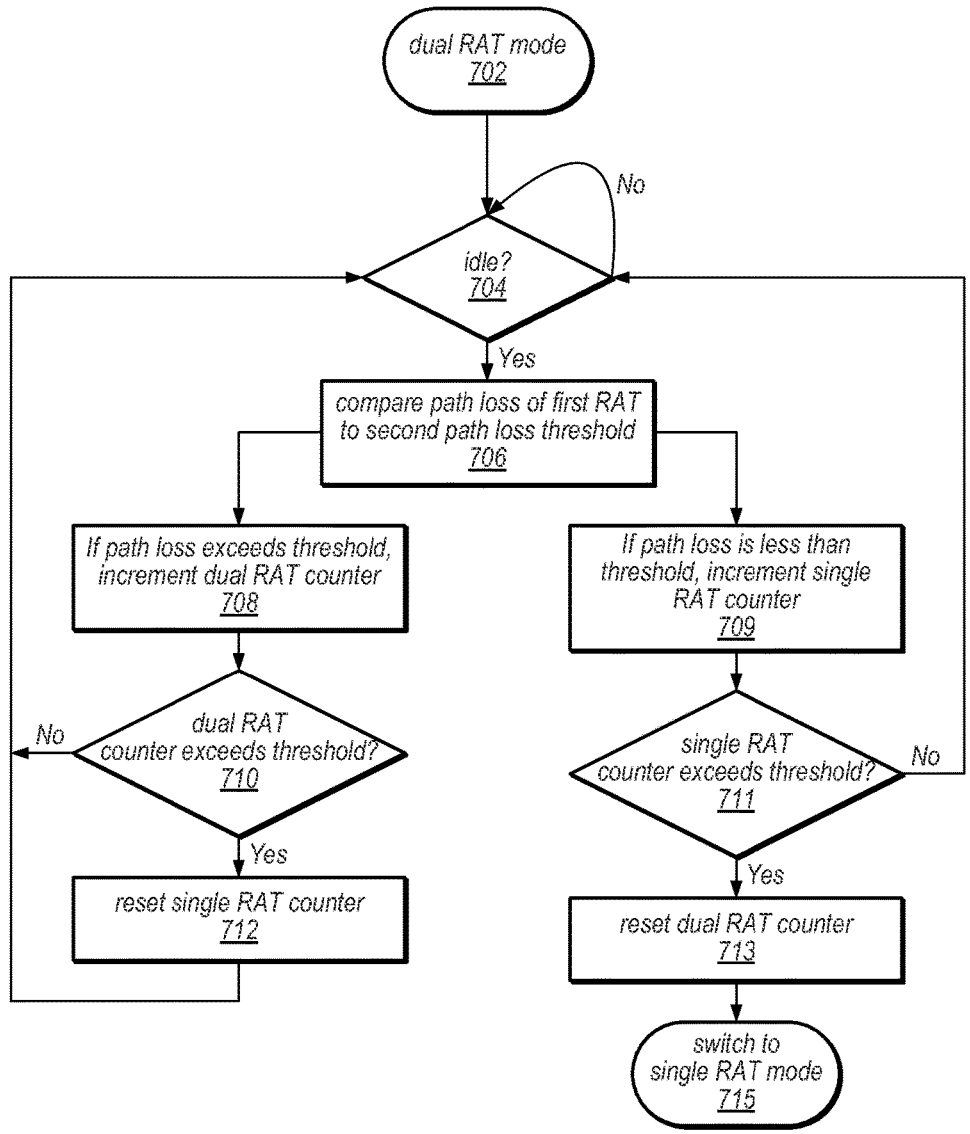
Figure 7B:
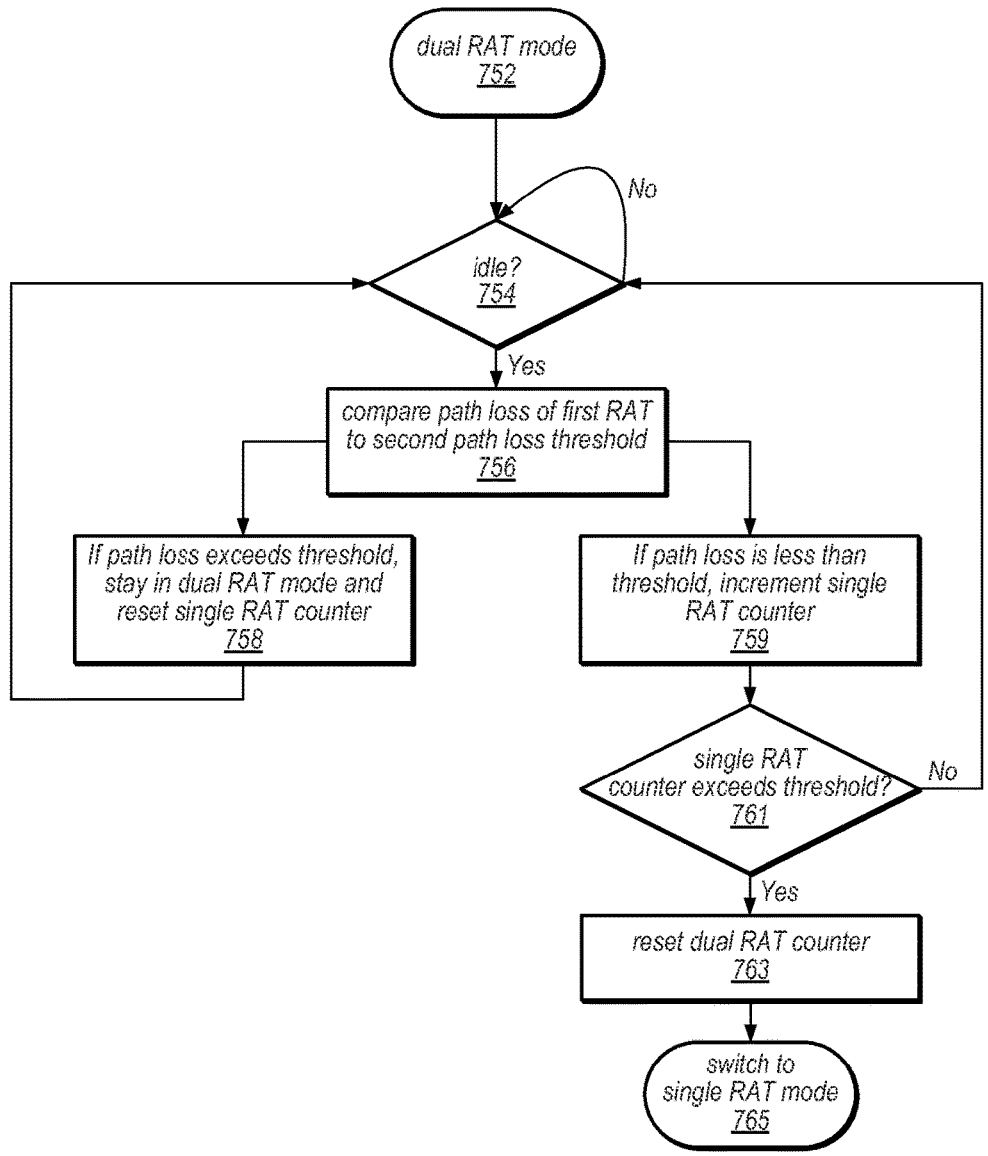

FIGS. 7A and 7B—Dual RAT Mode

FIG. 7A is a flowchart diagram illustrating a method while operating in a dual RAT mode. The method may be implemented by a wireless UE device (such as UE 106), which may be configured to communicate using multiple RATs. The method shown in FIG. 7A may be used in conjunction with any of the systems or devices shown in the above Figures, among other devices. For example, FIG. 7A may be considered a continuation of FIG. 6A, after switching from single RAT mode to dual RAT mode. Additionally, or alternatively, FIG. 6A may be considered a continuation of FIG. 7A, after switching from dual RAT mode to single RAT mode. In various embodiments, some of the method elements shown may be performed concurrently, in a different order than shown, or may be omitted. Note also that additional method elements may also be performed as desired. The method may be performed as follows.

As shown, in 702, the method may begin while in a dual RAT mode, e.g., using the first RAT and the second RAT discussed in FIG. 6. In one embodiment, during dual RAT mode, a single radio may be used for both RATs at the same time, e.g., by periodically tuning away from the first RAT to the second RAT in order to maintain connections using both RATs. Alternatively, the two RATs may be implemented using more than one radio, as desired.

Similar to FIG. 6A, the method may involve the use of one or more counters, e.g., the single RAT counter and the dual RAT counter. In one embodiment, these counters may be initially set to values of 0, e.g., upon entering the dual RAT mode. Additionally, the counters may be reset to 0 on a new RRC connection. However, the method may also maintain previous counter values, e.g., resulting from the implementation of the method of FIG. 6A. Additionally, the method may also be implemented without counters, if desired.

In the embodiment shown, the described steps below may be performed while in idle mode. Accordingly, in one exemplary embodiment, as shown in 704, the method may continue only while in idle mode, e.g., while the UE is idle in both the first RAT and the second RAT. However, it should be noted that there may be other embodiments where the method could be applied while not idling, as desired.

Continuing from 704, in 706, the current network conditions for the first RAT may be measured, e.g., at each scheduled wake-up period, which may be within each discontinuous reception (DRX) wake-up cycle. In one embodiment, as shown, the method may determine the current path loss for the first RAT, although other metrics may be used.

The current network conditions for the first RAT may be compared to a threshold associated with the metric used to measure the current network conditions. For example, where path loss is used, the current path loss may be compared to a second path loss threshold. This second path loss threshold may be set at a value where a call could be sustained using the first RAT and/or where, if path loss exceeded the threshold, the call could not be (or likely could not be) sustained. However, note that the second path loss threshold may be different from the first path loss threshold discussed in FIG. 6, e.g., for hysteresis. In the alternate expression: maximum allowed path loss−current path loss<=Y (or >Y)?, Y may be different from X, used in FIG. 5 above. However, in some embodiments the two thresholds may be the same, if desired. The result of this comparison results in the branching to 708 and 709, discussed below. Note that while the remainder of this discussion uses the path loss metric, the method may be extended to any other metric or combination of metrics, as desired.

Turning to 708, if the path loss exceeds the second maximum path loss threshold, then the dual RAT counter may be incremented. As discussed above, note that the comparison of the path loss to the threshold may be implemented in a variety of ways. For example, in one embodiment, the path loss may be compared directly to the second maximum path loss threshold; however, in alternate embodiments, the expression may be: maximum allowed path loss−current path loss<=Y? In this alternate expression there may be a value associated with maximum allowed path loss, and the result of the subtraction of that value from the current path loss may be compared to a threshold value Y. However, this expression could also easily be converted to the second maximum path loss threshold mentioned previously.

In 710, the method may determine if the dual RAT counter exceeds a dual RAT threshold. If not, the method may return to 704. If the dual RAT counter does exceed the dual RAT threshold, then the method may continue to 712, where the single RAT counter may be reset to 0, and the method may return to 704. Note that the dual RAT threshold and the single RAT threshold may be different or the same as the thresholds described in FIG. 6A, as desired.

Turning back to 709, in the case that the current path loss does not exceed the first maximum path loss threshold (or alternatively expressed: maximum allowed path loss−current path loss>Y?), the single RAT counter may be incremented.

In 711, the method compares the single RAT counter to a single RAT threshold. If the single RAT counter does not exceed the single RAT threshold, the method may return to 704. Alternatively, based on the single RAT counter exceeding the single RAT threshold, the dual RAT counter may be reset in 713 and the mode may be switched from dual RAT mode to single RAT mode in 715.

Thus, comparing the two sides of the flow chart, if the path loss is repeatedly less than the second maximum path loss threshold, as indicated by the single RAT counter, then the method may return to single RAT mode, e.g., due to the path loss indicating that the first RAT is able to sustain a call without needing the second RAT as backup. On the other hand, if the path loss repeatedly exceeds the maximum path loss threshold, as indicated by the dual RAT counter, then the single RAT counter may be reset. On the other hand, if the path loss is repeatedly below the maximum path loss threshold, as indicated by the single RAT counter, then the mode may be switched from dual RAT mode to single RAT mode. Accordingly, if the network quality is above the required threshold or is improving, such a switch is likely to occur.

Similar to discussions regarding FIG. 6A, note that the method may be modified to require that either counter represents consecutive failures or passes of the path loss comparison to the path loss threshold. For example, the single RAT counter may be used to represent repeated, consecutive failures of the path loss comparison. Accordingly, in such an embodiment, the mode would not be switched from single RAT mode to dual RAT mode unless the test was failed a repeated, consecutive number of times, rather than a cumulative number of times. Similar comments may apply to the dual RAT counter as well.

Similar to FIG. 6B, FIG. 7B is a flowchart diagram illustrating a method while operating in a dual RAT mode which may particularly apply to consecutive embodiments discussed above. The method may be implemented by a wireless UE device (such as UE 106), which may be configured to communicate using multiple RATs. The method shown in FIG. 7B may be used in conjunction with any of the systems or devices shown in the above Figures, among other devices. For example, FIG. 7B may be considered a continuation of FIG. 6B, after switching from single RAT mode to dual RAT mode. Additionally, or alternatively, FIG. 6B may be considered a continuation of FIG. 7B, after switching from dual RAT mode to single RAT mode. In various embodiments, some of the method elements shown may be performed concurrently, in a different order than shown, or may be omitted. Note also that additional method elements may also be performed as desired. The method may be performed as follows.

Steps 752, 754, 756, 759, 761, 763, and 765 may operate similarly to 702, 704, 706, 709, 711, 713, and 715, respectively, except that the embodiment of FIG. 7B may particularly apply to an embodiment where the single RAT counter must exceed the single RAT threshold on a consecutive basis, and may exclude other possibilities, such as cumulative values. In this embodiment, a dual RAT counter may not be necessary for the process of FIG. 7B. More specifically, since FIG. 7B corresponds to a consecutive embodiment, there is no need to maintain a dual RAT counter, and in cases where the path loss is exceeds the threshold, the UE may remain in dual RAT mode and the single RAT counter may simply be reset, as shown in 758.

Exemplary Operation

The following provides exemplary operation corresponding to the flowcharts of FIGS. 6 and 7, with exemplary values of the various thresholds and path losses. However, this described operation and the values are exemplary only and do not limit any of the presently described embodiments.

In the described operation, the path loss threshold may be implemented using the maximum path loss (MAPL)–path loss (PL)<=(or >) X and MAPL–PL<=(or >) Y. MAPL may be set to a value of 100 dB (although other values, such as 95 or 105 dB are envisioned). X may be 3 and Y may be 4. For operation corresponding to FIG. 6, the dual RAT mode counter threshold may be 5 and the single RAT mode counter threshold may be 1. For operation corresponding to FIG. 7, the single RAT mode counter threshold may be 6 and the dual RAT mode counter threshold may be 1.

According to one example, the method may initially begin in the single RAT mode, where the two counters are set to values of 0 and where the current path loss is 98. As a result, 100−98=2, which is less than the threshold 3 (X). Accordingly, the dual RAT counter is incremented from 0 to 1.

In the second iteration, the path loss is 90 dB. As a result, 100−90=10, which is greater than the threshold 3. Accordingly, the dual RAT counter may be reset from 1 to 0 because the counter threshold for the single RAT counter is 1. For the same reasons, the single RAT counter may also be reset to 0.

In the next iteration, the path loss is 98. As a result, 100−98=2, which is less than the threshold 3. Accordingly, the single RAT counter may be incremented to 1.

In the next iteration the path loss is 99, and so the single RAT counter may be incremented to 2. This process may continue until the counter is incremented to 5, without any point where the MAPL−PL is greater than 3, resulting in a comparison of the quality of the first RAT to the second RAT. Upon determining that the second RAT has higher quality than the first RAT, the mode may be switched from the single RAT mode to the dual RAT mode.

Upon entering the dual RAT mode, the two counters are again set to values of 0. In the first iteration, the path loss is 95. As a result, 100−95=3, which is greater than 4. Accordingly, the single RAT mode is incremented from 0 to 1.

In the second iteration, the path loss is 96. As a result 100−96=4, which is equal to the threshold Y. Accordingly, the single RAT mode counter is reset since the dual RAT mode counter threshold is 1. Additionally, the dual RAT mode counter is incremented to 1 and then reset, since the dual RAT mode counter threshold is 1.

In following iterations, the path loss is 95 or less for 6 consecutive times. As a result, the mode may be switched form the dual RAT mode to the single RAT mode.

Dual RAT Mode Based on Registration

In addition to embodiments discussed above, the UE may enter dual RAT mode based on other considerations, e.g., registration for the legacy or circuit switched network. For example, there may be situations where the UE is communicating using the first RAT (e.g., LTE), but either fails to receive an incoming page for a call or the network does not receive the UE's response to the incoming page. In these situations, the network may presume there is an issue with the LTE communication and send the page via the second RAT (e.g., the circuit switched RAT). However, in order to receive the page on the second RAT, the UE must keep its registration of the second RAT up to date. Accordingly, based on registration rules, the UE may periodically need to switch from single RAT mode to dual RAT mode in order to perform registration or reregistration for the second RAT.

Figure 8:
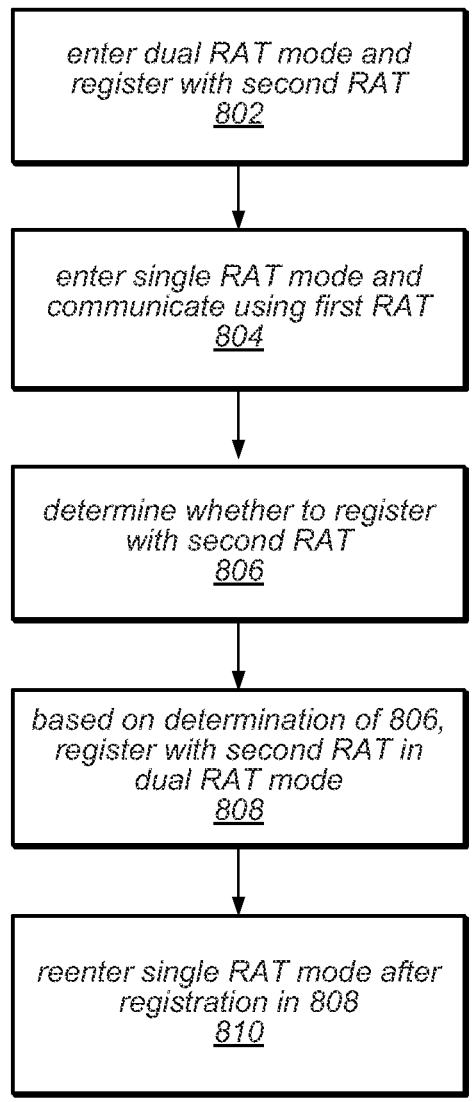

FIG. 8—Dual RAT Mode Based on Registration

FIG. 8 is a flowchart diagram illustrating a method while operating in a single RAT mode. The method may be implemented by a wireless UE device (such as UE 106), which may be configured to communicate using multiple RATs. The method shown in FIG. 8 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 802, the UE may initially enter a dual RAT mode. In the dual RAT mode, the UE may communicate with a first base station using a first RAT (e.g., LTE) and/or may register the UE with a second RAT (e.g., by communicating with a second base station associated with the second RAT). In some embodiments, 802 may be performed upon power up of the UE, or other similar situations.

In 804, the UE may enter a single RAT mode and communicate only using the first RAT.

In 806, e.g., while in the single RAT mode, the UE may determine whether registration should be performed for the second RAT. For example, this determination may be based on various registration rules associated with the second RAT. Generally, the registration rules may be categorized as time based registration rules or location based registration rules. For example, a time base registration rule may be that the UE needs to register periodically, e.g., based on a timer. Accordingly, the determination in 806 may be simply determining if the time since the last registration exceeds a threshold timer value, or that a timer has expired for registration of the second RAT.

Location based registration rules may relate to various factors, such as changes in base station, changes in zone, changes in tracking area, etc. In order to determine whether to register with the second RAT, the UE may enter the dual RAT mode in response to various triggers. As one example, when the UE switches base stations for the first RAT, it may enter the dual RAT mode and determine whether any of the location based rules require registration for the second RAT. As another example, the UE may measure changes in location via GPS and when a threshold distance has been traversed, the UE may communicate on the second RAT to determine if registration should occur (e.g., based on the location-based registration rules of the second RAT).

In 808, based on the determination in 806, the UE may register with the second RAT, e.g., while in dual RAT mode.

After registration, in 810, the UE may reenter single RAT mode.

Dual RAT Mode Based on Power Consumption

In addition to embodiments discussed above, the UE may enter dual RAT mode based on other considerations, e.g., power use when communicating using the first RAT, e.g., within the single RAT mode. More specifically, base stations of the first RAT (e.g., enodeB's of LTE) may implement parameters that affect power consumption during voice calls. In some embodiments, these parameters are specific to each base station. Accordingly, if the parameters of the base station result in power consumption above a desirable level, then the UE may enter dual RAT mode in order to perform voice calls on the second RAT, which may use less power. For example, if the parameters implemented on the first RAT would result in more power consumption for a voice call on the first RAT than if the voice call were performed on the second RAT, then the UE may enter the dual RAT mode in order to perform voice calls using the second RAT. This determination may be performed each time the UE connects to a new base station.

In some embodiments, this power consumption may be expressed in "talk time". For example, if the talk time of the UE for the first RAT is lower than the talk time of the UE for the second RAT (i.e., if the battery would be consumed faster using the first RAT than the second RAT for voice calls), then the UE may enter the dual RAT mode in order to use the second RAT for voice calls.

Figure 9:
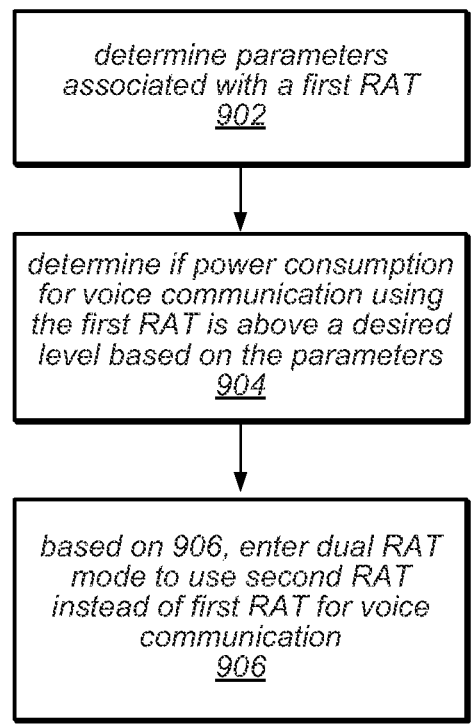

FIG. 9—Dual RAT Mode Based on Power Consumption

FIG. 9 is a flowchart diagram illustrating a method while operating in a single RAT mode. The method may be implemented by a wireless UE device (such as UE 106), which may be configured to communicate using multiple RATS. The method shown in FIG. 9 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 902, the UE may determine parameters associated with a first RAT, e.g., which are specific to a first base station of the first RAT to which the UE is currently connected.

In 904, the UE may determine if the parameters indicate power consumption when using the first RAT for voice communication above a desired level. For example, the UE may determine if the parameters of the first RAT would result in higher power consumption when performing voice communication using the first RAT than the power consumption when performing voice communication using the second RAT. In one embodiment, the UE may compare the talk time (e.g., the remaining hours or minutes that the battery would allow for voice communication) available using the first RAT to the talk time available using the second RAT.

Exemplary parameters may include CDRX parameters. For example, the following CDRX parameter ranges may be desirable: on duration parameter level of 2-4 ms, inactivity timer of 2-4 ms, ReTx Timer of 2, Long DRX Cycle of 40, etc. Other parameters may include packet bundling (e.g., a value of 2 may be desirable). If using dynamic scheduling, grants every 40 ms aligned with the CDRX on duration may be preferable. Additionally, if scheduling requests are transmitted, a 40 ms periodicity aligned with the C-DRX on duration may be preferable. If using semi-persistent scheduling, semiPersistenSchedIntervalUL and semiPersistenSchedIntervalDL of sf40 aligned with the C-DRX on duration may be preferable. For HARQ, a maximum value of up to 4 transmission for "No TTI bundling" and up to 12 transmission for "With TTI bundling" may be desired. For CQI, supporting "Periodic CQI Supported" with a periodicity of 80 ms may be desired, while not supporting "Aperiodic CQI Supported" may be desired. For IMS re-registration, a value of two hours may be desired. Note that these parameters and parameter values are exemplary only and do no limit the embodiments described herein.

Evaluating the parameters may be done on an individual level or a holistic level, as desired. For example, each individual parameter may be compared to a desired range or value. If one or a threshold number of these parameter values are outside of the desired range or value, then the determination of 904 may indicate that the power consumption is above the desired level. Alternatively, the UE may compare the effect of the set of parameters to determine if the power consumption is above the desired level.

In 906, if the parameters indicate a power consumption above the desired level, the UE may enter the dual RAT mode, or more generally, may use the second RAT for voice communication instead of the first RAT.

The method of FIG. 9 may be performed each time the UE connects to a new base station of the first RAT, or more generally, for each base station of the first RAT.

Figure 10:
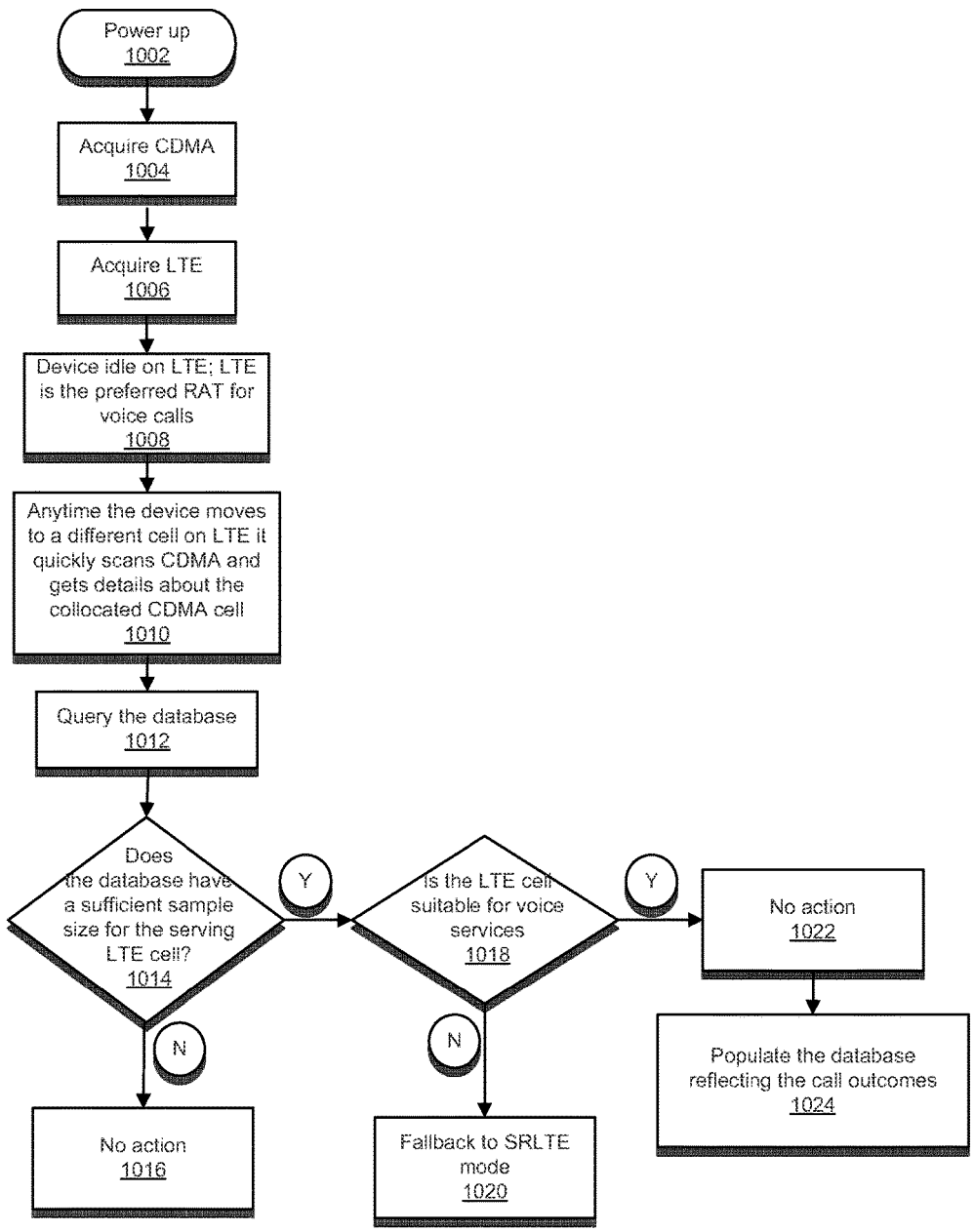
Figure 11:
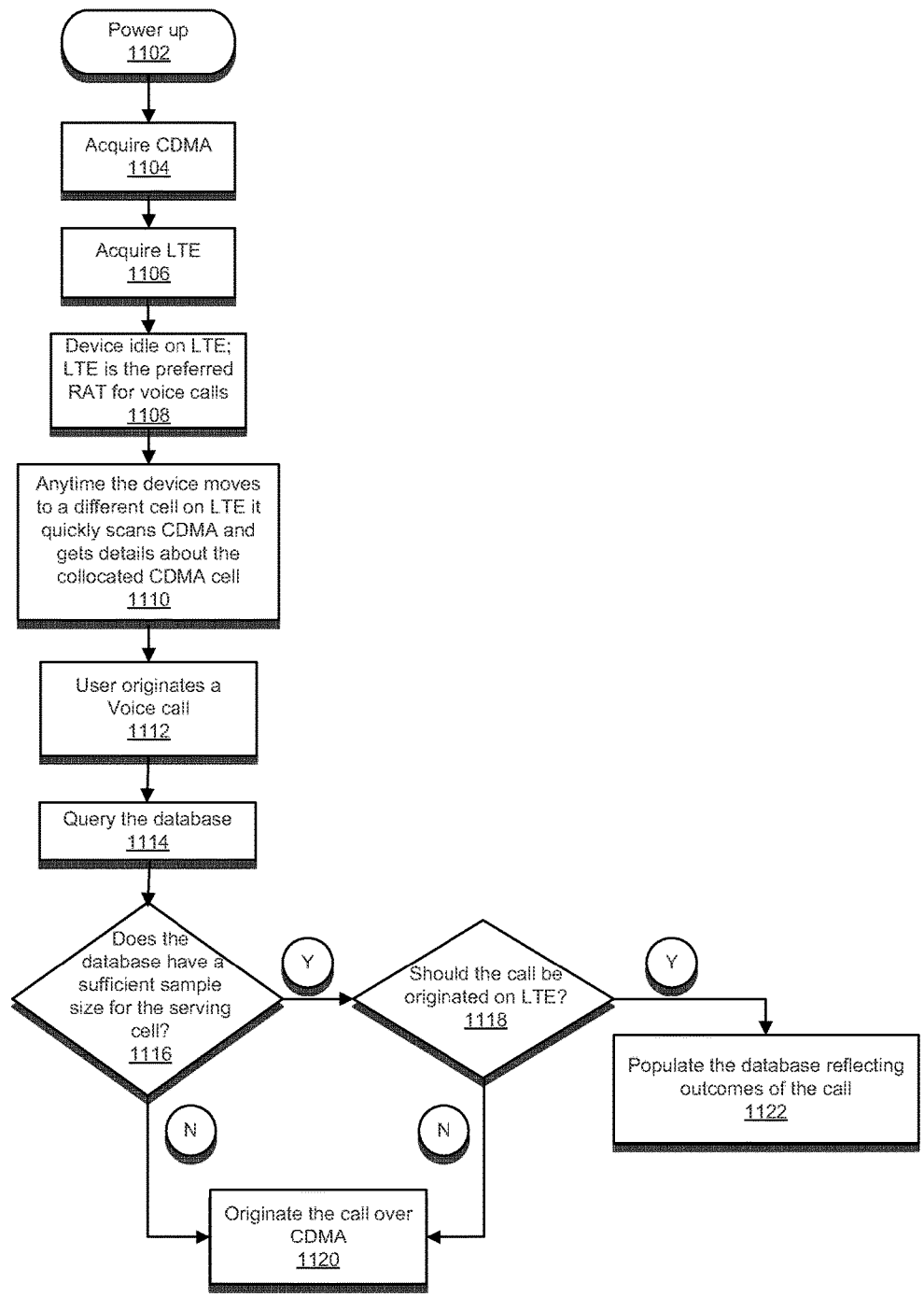

FIGS. 10 and 11—Selecting RAT Mode Based on Database Information

FIGS. 10 and 11 are flowcharts illustrating exemplary methods for selecting a RAT mode based on data in a database related to information of various cells and/or networks. In particular, the UE may maintain a database that stores one or more of the following items: LTE: Cell ID, TAC (tracking area code), PCI (physical cell ID); CDMA: SID (system ID), NID (network ID), Zone ID, BS ID, PN (Pseudo Noise) sequence, Number of calls on LTE, Voice call setup success percent on LTE, normal voice call end percent on LTE, etc., e.g., for each LTE base station, although other entities are also envisioned, such as for each cell, network, RAT, etc.

Note that while the two RATs of FIGS. 10 and 11 are described and shown as LTE and CDMA, other RATs are envisioned as well, e.g., LTE and GSM as well as non-LTE RAT combinations, among others. Thus, the RATs LTE and CDMA are exemplary only and other combinations of RATs are envisioned. In FIGS. 10 and 11, the UE may initially operate in a single RAT mode, e.g., for the first RAT.

FIG. 10 is a flowchart diagram illustrating a method for selecting a RAT mode based on database information. The method may be implemented by a wireless UE device (such as UE 106), which may be configured to communicate using multiple RATs. The method shown in FIG. 10 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 1002, the UE may be powered up, e.g., based on user input.

In 1004, the UE may acquire the second RAT, e.g., a base station associated with the second RAT, in this case shown as CDMA.

In 1006, the UE may acquire the first RAT, e.g., a base station associated with the first RAT, in this case shown as LTE.

In 1008, the UE may idle on the first RAT (e.g., LTE) and the first RAT may be designated as the preferred RAT for voice calls.

In 1010, when the device moves to a different cell on the first RAT (e.g., LTE), it may scan the second RAT (e.g., CDMA) to determine details about the collocated second RAT cell. However, the steps following 1010 may also be performed at other times, i.e., they may also be performed at times other than when a cell of the first RAT changes.

In 1012, the UE may query its database, e.g., corresponding to the current base station of the first RAT.

In 1014, the UE may determine if the database has a sufficient sample size for the base station of the first RAT.

If it does not, in 1016, the method may complete without taking an action. For example, in this instance, it may still use the first RAT (e.g., LTE), e.g., in order to gather more data about the current cell.

If it does, the method may continue to 1018, where the device may determine if the base station of the first RAT is suitable for voice services, e.g., by determining current channel conditions and/or if variables (such as those found in the database) are sufficient to support voice services on the first RAT using the base station. For example, one or more variables (or combinations of variables) stored in the database associated with the current first RAT cell may be compared to thresholds to determine if the first RAT base station can support the voice services. As one example, the voice call setup success percent may be compared to a threshold and/or the voice call end percent on the first RAT may be compared to a threshold. If one or both of these exceed the threshold (as one example, among many possibilities), then the first RAT may be deemed suitable for voice services. Other comparisons are envisioned, such as the voice call quality of previous calls to a voice call quality threshold (e.g., based on jitter, which may be common with some LTE cells).

If the first RAT base station is not suitable, in 1020, the device may enter the dual RAT mode (shown as SRLTE in the flowchart).

If the first RAT base station is suitable, in 1022, no action may be taken, e.g., since an incoming call (e.g., a mobile terminated call) could use the first RAT for voice services.

In 1024, the database may be populated reflecting any variables associated with any calls that occur, e.g., a mobile terminated call. For example, if the call setup was successful, the call setup percentage for the base station of the first RAT may be updated. Similarly, the database may be updated to reflect call end outcomes, if call setup was successful. Voice quality or other metrics of the call may also be updated.

FIG. 11 is a flowchart diagram illustrating a method for selecting a RAT mode based on database information, e.g., during call setup. The method may be implemented by a wireless UE device (such as UE 106), which may be configured to communicate using multiple RATs. The method shown in FIG. 11 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

1102-1110 may be substantially the same as 1002-1010.

In 1112, the user may originate a voice call. However, in alternate embodiments, 1112 and FIG. 11 in general may also correspond to mobile terminated calls, as desired.

In 1114, the database may be queried, similar to 1012 above.

In 1116, the UE may determine if the database has a sufficient sample size for the base station of the first RAT.

If it does, in 1118, the UE may determine if the call should be originated on the first RAT (e.g., LTE) using whatever criteria is appropriate.

If either 1116 or 1118 return a negative result, the UE may use the second RAT (e.g., CDMA) for the voice call (e.g., enter the dual RAT mode and may use the second RAT for the call).

If 1116 and 1118 return positive results, in 1122, the database (e.g., the entry for the current base station of the first RAT) may be populated with the outcomes of the call. For example, the database may be updated based on the call setup outcome of the call, similar to 1024, discussed above. Additionally, if the call setup was successful (e.g., using the first RAT), the database (e.g., the entry for the current base station of the first RAT) may be updated to reflect the call end outcome. Other variables may also be updated, such as voice quality, or any other metrics that may be useful for the database, e.g., for determining whether to use the base station of the first RAT for future calls.

Note that the above-described embodiments may be particularly useful in situations where single radio voice call continuity (SRVCC) is not supported by the network, though the embodiments described above may also apply when it is supported.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a user equipment (UE) having a radio configured to communicate using at least a first radio access technology (RAT) and a second RAT, the method comprising:
   while operating the radio in a single RAT mode using the first RAT:
      determining, by the UE, if current path loss for the first RAT exceeds a first maximum path loss threshold;
      based on the current path loss exceeding the first maximum path loss threshold, determining, by the UE, to operate the radio in a dual RAT mode; and
   switching, by the UE, from operating the radio in the single RAT mode to the dual RAT mode based on the determination to operate in the dual RAT mode.

2. The method of claim 1, further comprising:
   based on the current path loss exceeding the first maximum path loss threshold, determining path loss of the second RAT;
   wherein said switching is also based on the path loss of the second RAT.

3. The method of claim 1, further comprising:
   based on the current path loss exceeding the first maximum path loss threshold, incrementing a counter;
   wherein said switching is based on the counter exceeding a threshold.

4. The method of claim 3, further comprising:
   repeating, at a later time, determining if current path loss at the later time for the first RAT exceeds the first maximum path loss threshold;
   based on the current path loss at the later time not exceeding the first maximum path loss threshold, modifying the counter.

5. The method of claim 4, wherein said modifying the counter comprises resetting the counter and is performed in response to the current path loss at the later time not exceeding the first maximum path loss threshold a threshold number of times in a row.

6. The method of claim 1, further comprising:
   at a later time, while operating the radio in the dual RAT mode, using the first RAT and the second RAT:
      determining if current path loss at the later time for the first RAT is less than a second maximum path loss threshold;
      based on the current path loss at the later time being less than the second maximum path loss threshold, determining to operate in the single RAT mode; and
   switching from operating in the dual RAT mode to the single RAT mode, wherein the single RAT mode corresponds to the first RAT.

7. The method of claim 6, wherein the first maximum path loss threshold and the second maximum path loss threshold are different.

8. The method of claim 1, wherein the first RAT comprises long term evolution (LTE) and wherein the second RAT comprises a circuit switched technology.

9. A user equipment (UE), the UE comprising:
   a radio, comprising one or more antennas configured for wireless communication, wherein the radio is configured to communicate using at least a first radio access technology (RAT) and a second RAT; and
   a processing element coupled to the radio;
   wherein the radio and the processing element are configured to:
      while operating the radio in a dual RAT mode, using the first RAT and the second RAT:
         determine if current path loss for the first RAT is less than a first maximum path loss threshold;
         based on the current path loss being less than the first maximum path loss threshold, determining to operate in a single RAT mode; and
      switching from operating the radio in the dual RAT mode to a single RAT mode, wherein the single RAT mode corresponds to the first RAT.

10. The UE of claim 9, wherein the radio and the processing element are configured to:
    based on the current path loss being less than the first maximum path loss threshold, increment a counter;
    wherein said switching is based on the counter exceeding a threshold.

11. The UE of claim 10, wherein the radio and the processing element are configured to:
    repeat, at a later time, determining if current path loss at the later time for the first RAT is less than the first maximum path loss threshold;
    based on the current path loss at the later time exceeding the first maximum path loss threshold, modifying the counter.

12. The UE of claim 11, wherein modifying the counter comprises resetting the counter and is performed in response to the current path loss at the later time exceeding the first maximum path loss threshold a threshold number of times in a row.

13. The UE of claim 11, wherein the radio and the processing element are configured to:
    at a later time, while operating the radio in the single RAT mode, using the first RAT:

determine if current path loss at the later time for the first RAT exceeds a second maximum path loss threshold;

based on the current path loss at the later time exceeding the second maximum path loss threshold, determine to operate in the dual RAT mode; and switch from operating the radio in the single RAT mode to the dual RAT mode based on the determination to operate in the dual RAT mode.

14. The UE of claim 13, wherein the first maximum path loss threshold and the second maximum path loss threshold are different.

15. The UE of claim 9, wherein the first RAT comprises long term evolution (LTE) and wherein the second RAT comprises a circuit switched technology.

16. A non-transitory, computer accessible memory medium storing program instructions for determining whether to operate in a single radio access technology (RAT) mode or a dual RAT mode for a user equipment (UE) having a radio configured to communicate using at least a first RAT and a second RAT, wherein the program instructions are executable by a processor to:

determine whether current path loss for the first RAT exceeds a maximum path loss threshold;

based on results of determining whether the current path loss for the first RAT exceeds the maximum path loss threshold, determine whether to operate the radio in the single RAT mode or the dual RAT mode; and operate the radio in the single RAT mode or the dual RAT mode based on the determination of whether to operate in the single RAT mode or the dual RAT mode.

17. The non-transitory, computer accessible memory medium of claim 16, wherein said determining the current path loss is performed while in the single RAT mode, wherein the results of determining whether the current path loss for the first RAT exceeds the maximum path loss threshold comprises the current path loss exceeding the maximum path loss threshold, wherein said determining whether to operate in the single RAT mode or the dual RAT mode comprises determining to operate in the dual RAT mode, and wherein said operating in the single RAT mode or the dual RAT mode comprises switching from the single RAT mode to the dual RAT mode.

18. The non-transitory, computer accessible memory medium of claim 16, wherein said determining the current path loss is performed while in the dual RAT mode, wherein the results of determining whether the current path loss for the first RAT exceeds the maximum path loss threshold comprises the current path loss being less than the maximum path loss threshold, wherein said determining whether to operate in the single RAT mode or the dual RAT mode comprises determining to operate in the single RAT mode, and wherein said operating in the single RAT mode or the dual RAT mode comprises switching from the dual RAT mode to the single RAT mode.

19. The non-transitory, computer accessible memory medium of claim 16, wherein the program instructions are further executable to:

modify a counter based on the results of determining whether the current path loss for the first RAT exceeds the maximum path loss threshold; and wherein said determining whether to operate in the single RAT mode or the dual RAT mode is based on the counter.

20. The non-transitory, computer accessible memory medium of claim 16, wherein the first RAT comprises a packet switched technology and wherein the second RAT comprises a circuit switched technology.

* * * * *